(12) United States Patent
Durante et al.

(10) Patent No.: US 8,819,043 B2
(45) Date of Patent: Aug. 26, 2014

(54) COMBINING SONG AND MUSIC VIDEO PLAYBACK USING PLAYLISTS

(75) Inventors: Samantha Susan Durante, Bellevue, WA (US); Kraldon T. Ferch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/942,384

(22) Filed: Nov. 9, 2010

(65) Prior Publication Data

US 2012/0117042 A1   May 10, 2012

(51) Int. Cl.
*G06F 17/30*   (2006.01)

(52) U.S. Cl.
USPC ........... 707/758; 707/705; 707/781; 707/914; 707/916

(58) Field of Classification Search
None
See application file for complete search history.

(56) References Cited

U.S. PATENT DOCUMENTS

| | | | |
|---|---|---|---|
| 6,965,770 B2 * | 11/2005 | Walsh et al. | 455/426.1 |
| 6,993,532 B1 * | 1/2006 | Platt et al. | 707/736 |
| 6,998,527 B2 * | 2/2006 | Agnihotri | 84/609 |
| 7,027,124 B2 * | 4/2006 | Foote et al. | 352/1 |
| 7,191,193 B2 * | 3/2007 | Ben-Yaacov et al. | 360/32 |
| 7,196,258 B2 * | 3/2007 | Platt | 84/600 |
| 7,228,054 B2 | 6/2007 | Cowgill | |
| 7,623,755 B2 * | 11/2009 | Kuspa | 386/282 |
| 7,685,210 B2 * | 3/2010 | Plastina et al. | 707/805 |
| 7,707,224 B2 * | 4/2010 | Chastagnol et al. | 707/783 |
| 7,756,388 B2 * | 7/2010 | Plastina et al. | 386/241 |
| 7,756,915 B2 | 7/2010 | Ben-Yaacov et al. | |
| 7,917,477 B2 * | 3/2011 | Hutson et al. | 707/668 |
| 8,615,157 B1 * | 12/2013 | Isaacson et al. | 386/241 |
| 8,626,732 B2 * | 1/2014 | Galuten | 707/705 |
| 2002/0082901 A1 * | 6/2002 | Dunning et al. | 705/10 |
| 2004/0261040 A1 * | 12/2004 | Radcliffe et al. | 715/840 |
| 2006/0085751 A1 | 4/2006 | O'Brien et al. | |
| 2006/0212478 A1 * | 9/2006 | Plastina et al. | 707/104.1 |
| 2007/0038672 A1 * | 2/2007 | Plastina et al. | 707/104.1 |
| 2008/0065989 A1 * | 3/2008 | Conroy et al. | 715/716 |
| 2008/0109488 A1 * | 5/2008 | Hempleman et al. | 707/104.1 |
| 2008/0147711 A1 * | 6/2008 | Spiegelman et al. | 707/102 |
| 2008/0148152 A1 * | 6/2008 | Blinnikka et al. | 715/719 |
| 2008/0189318 A1 * | 8/2008 | Bourke et al. | 707/102 |
| 2009/0024927 A1 * | 1/2009 | Schrock et al. | 715/722 |
| 2009/0177989 A1 * | 7/2009 | Ma et al. | 715/766 |
| 2009/0304359 A1 * | 12/2009 | Lemay et al. | 386/96 |
| 2010/0042682 A1 * | 2/2010 | Kaye | 709/203 |

(Continued)

OTHER PUBLICATIONS

"Organize and Search Your Digital Media Collection", Retrieved at<<http://www.microsoft.com/windows/windowsmedia/knowledgecenter/howto/mp11/library.aspx>>, May 2006, pp. 4.

(Continued)

*Primary Examiner* — Kaveh Abrishamkar
*Assistant Examiner* — James J Wilcox
(74) *Attorney, Agent, or Firm* — Micah Goldsmith; Glen Johnson; Micky Minhas (57) ABSTRACT

A single playlist can be generated that includes both songs and music videos. Additionally, a song on a playlist can be identified and a check made as to whether a music video corresponding to the identified song is available. If a music video corresponding to the identified song is not available, then the identified song is played back. However, if a music video corresponding to the identified song is available, then the music video is played back instead of the identified song.

20 Claims, 7 Drawing Sheets

(56) References Cited

U.S. PATENT DOCUMENTS

| | | | |
|---|---|---|---|
| 2010/0162330 A1* | 6/2010 | Herlein et al. | 725/93 |
| 2010/0180304 A1* | 7/2010 | Hassell et al. | 725/44 |
| 2011/0035222 A1* | 2/2011 | Schiller | 704/260 |
| 2011/0264755 A1* | 10/2011 | Salvatore De Villiers | 709/206 |

OTHER PUBLICATIONS

Wang, et al., "Cataloging and Search Engine for Video Library", Retrieved at <<http://www.acs.org.au/documents/public/crpit/CRPITV2Wang.pdf>>, Conferences in Research and Practice in Information Technology, vol. 2, 2000, pp. 2.

"CueVideo", Retrieved at <<http://www.almaden.ibm.com/projects/cuevideo.shtml>>, 2002, pp. 2.

Hollington, Jesse David, "The Complete Guide to Managing iTunes Videos", Retrieved at <<http://www.ilounge.com/index.php/articles/comments/the-complete-guide-to-managing-itunes-videos/>>, Sep. 23, 2009, pp. 18.

\* cited by examiner

COMBINING SONG AND MUSIC VIDEO PLAYBACK USING PLAYLISTS

BACKGROUND

Computers and other types of audio and/or video playback devices have become increasingly popular. While such playback devices can provide benefits to their users, they are not without their problems. One such problem is that such devices typically maintain different types of content, such as audio content and video content, separately. This can result in cumbersome interfaces for users interacting with such devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a song on a playlist is identified and a check made as to whether a music video corresponding to the identified song is available. If a music video corresponding to the identified song is not available, then the identified song is played back. However, if a music video corresponding to the identified song is available, then the music video is played back instead of the identified song.

In accordance with one or more aspects, an identification of one or more songs is received and an identification of one or more music videos is received. A single playlist is generated that includes both the one or more songs and the one or more music videos.

BRIEF DESCRIPTION OF THE DRAWINGS

The same numbers are used throughout the drawings to reference like features.

DETAILED DESCRIPTION

Combining song and music video playback using playlists is discussed herein. A playlist can include both songs and music videos. A user can generate such a playlist, adding both songs and music videos to the playlist as he or she desires. Additionally, music videos can be automatically selected to replace songs on the playlist. If a music video that corresponds to a song on the playlist is available, then the music video is played back rather than the song. The music video can replace the song on the playlist, or the playlist can remain unaltered and the music video played back instead of the song when the playlist is being played back.

Figure 1:
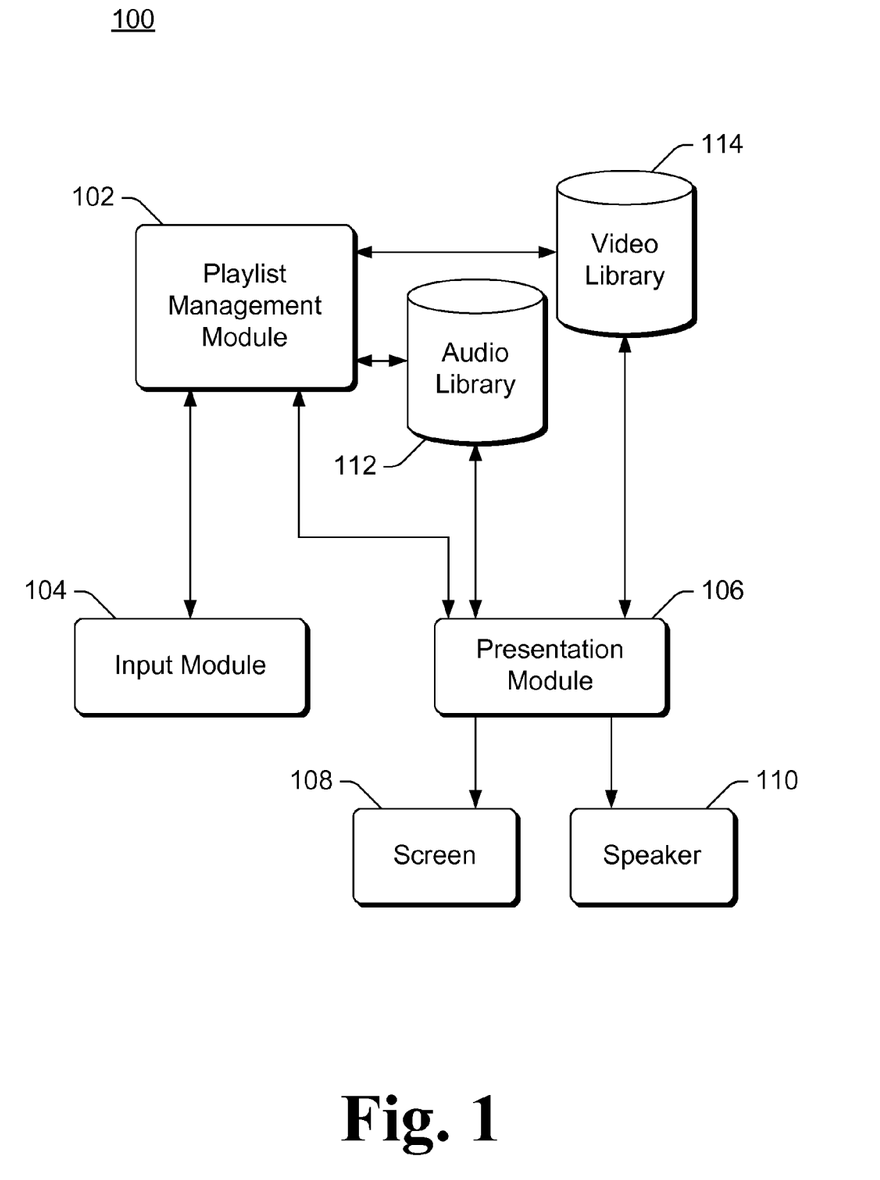
FIG. 1 illustrates an example computing system implementing the combining song and music video playback using playlists in accordance with one or more embodiments.

FIG. 1 illustrates an example computing system 100 implementing the combining song and music video playback using playlists in accordance with one or more embodiments. Computing system 100 includes a playlist management module 102, an input module 104, a presentation module 106, a screen 108, a speaker 110, an audio library 112, and a video library 114. Each of modules 102-106, screen 108, speaker 110, and libraries 112-114 can be implemented on the same device. Alternatively, modules 102-106, screen 108, speaker 110, and libraries 112-114 can be implemented across multiple devices in various combinations. For example, playlist management module 102 can be implemented on one computing device (e.g., on a server), modules 104-106 and libraries 112-114 can be implemented on another computing device (e.g., a gaming station), and screen 108 and speaker 110 can be implemented as a separate display device (e.g., a television or monitor).

Additionally, although only one of each of modules 102-106, screen 108, speaker 110, and libraries 112-114 are illustrated in FIG. 1, it should be noted that computing system 100 can include any number of each of modules 102-106, screen 108, speaker 110, and libraries 112-114. For example, computing system 100 can include multiple screens 108, multiple speakers 110, multiple audio libraries 112, multiple video libraries 114, multiple presentation modules 106, multiple input modules 104, and/or multiple playlist management modules 102. If computing system includes multiple ones of any of modules 102-106, screen 108, speaker 110, and libraries 112-114, these multiple ones of modules 102-106, screen 108, speaker 110, and libraries 112-114 can be implemented on the same or different computing devices.

Furthermore, it should be noted that one or more of modules 102-106, screen 108, speaker 110, and libraries 112-114 can be combined and implemented as a single module, single library, single device, and so forth. For example, audio library 112 and video library 114 can be implemented as a single audio and video library. By way of another example, playlist management module 102 and presentation module 106 can be implemented as a single module.

One or more of a variety of different types of devices can be used to implement various ones of modules 102-106, screen 108, speaker 110, and libraries 112-114. Examples of such devices include desktop computers, notepad or tablet computers, netbook or laptop computers, server computers, mobile stations, entertainment appliances, set-top boxes communicatively coupled to one or more display devices, televisions, cellular or other wireless phones, game consoles, automotive computers, and so forth. When implemented as different devices, these devices can communicate with one another in a variety of different manners. For example, devices can communicate with one another using a variety of different networks, such as the Internet, a local area network (LAN), a public telephone or other phone network, an intranet, other public and/or proprietary networks, combinations thereof, and so forth. By way of another example, devices can communicate with one another via other types of communication mechanisms or connections, such as various wired connections (e.g., universal serial bus (USB) connections, IEEE 1394 connections, etc.), various wireless connections (e.g., wireless USB connections, Bluetooth connections, etc.), combinations thereof, and so forth.

Input module 104 receives user inputs from a user of computing system 100. Input module 104 can be implemented in software, firmware, hardware, or combinations thereof. User inputs can be provided in a variety of different manners, such as by pressing one or more keys of a keypad or keyboard of system 100, pressing one or more keys of a controller (e.g., remote control device, mouse, trackpad, etc.) of system 100, pressing a particular portion of a touchpad or touchscreen of system 100, making a particular gesture on a touchpad or touchscreen of system 100, and/or making a particular gesture on a controller (e.g., remote control device, mouse, trackpad, etc.) of system 100. User inputs can also be provided via other physical feedback input to the system, such as tapping any portion of a device implementing module 104, any action that can be recognized by a motion detection component of a device implementing module 104 (such as shaking the device, rotating the device, etc.), and so forth. User inputs can also be provided in other manners, such as via audible inputs to a microphone, via motions of hands or other body parts observed by an image capture device, and so forth. These user inputs allow a user to interact with computing system 100, such as by inputting particular characters or symbols, selecting particular buttons or menu options, dragging and dropping various descriptions or images, and so forth.

Screen 108 can be implemented in a variety of different manners, such as using liquid crystal display (LCD) technology, plasma screen technology, image projection technology, and so forth. Similarly, speaker 110 can be implemented in a variety of different manners, such as free-standing speakers, speakers included as part of another device (e.g., a television, a wireless phone, etc.), speakers included as part of headphones, and so forth.

Presentation module 106 generates, manages, and/or outputs data to be displayed, played back, or otherwise presented to a user of computing system 100. For example, presentation module 106 manages providing video data for music videos to be displayed on screen 108. By way of another example, presentation module 106 manages providing audio data for songs or music videos to be played back audibly by speaker 110.

Playlist management module 102 manages playlists for a user of computing system 100. This management can include creating playlists, storing and subsequently retrieving playlists, modifying playlists, and so forth. A playlist is a list of one or more pieces of audio and/or video content that can be played back by a user of computing system 100. The user can provide various inputs (e.g., as discussed above referring to input module 104) to add pieces of audio and/or video content to a playlist, to remove pieces of audio and/or video content from a playlist, to rearrange pieces of audio and/or video content on a playlist, to select a particular playlist for playback, and so forth. A user can also create, store, and retrieve multiple different playlists.

In one or more embodiments, each piece of audio and/or video content in a playlist is a song or a music video. A song refers to audio content that is played back by computing system 100 audibly. A music video, on the other hand, refers to both audio content that is played back by computing system 100 audibly and also corresponding video content that is displayed by computing system 100. Various discussions herein refer to songs and music videos, although it should be noted that the techniques discussed herein can alternatively be used with other types of audio and/or video content.

In one or more embodiments, presentation module 106 automatically swaps music videos for songs, resulting in a music video being played back rather than a song. Alternatively, other components or modules, such as playlist management module 102, can automatically swap music videos for songs on a playlist. This automatic swapping of music videos for songs is discussed in more detail below.

Songs are maintained in audio library 112, and can be stored in a variety of different formats, such as MP3 (MPEG-1 or MPEG-2 Audio Layer 3) files, WMA (Windows Media Audio) files, MPEG-4 Audio files, WAV (Waveform Audio File Format) files, and so forth. Each song is typically stored as a single file that includes the audio content and metadata associated with the audio content, although other storage formats can alternatively be used. For example, the audio content can be stored in one file and metadata associated with the audio content stored in another file, table, or other data structure. Audio library 112 can be a particular one or more folders, a particular one or more directories, or different data storage structures.

The music videos are maintained in video library 114, and can be stored in a variety of different formats, such as MP4 (MPEG-4) files, WMV (Windows Media Video) files, and so forth. Each music video is typically stored as a single file that includes the audio and video content for the music video for a particular song as well as metadata associated with the audio and video content, although other storage formats can alternatively be used. For example, the audio and video content can be stored in one file and metadata associated with the audio and video content stored in another file, table, or other data structure. Video library 114 can be a particular one or more folders, a particular one or more directories, or different data storage structures.

A variety of different information describing a song or music video can be included as metadata associated with that song or music video. For example, the metadata associated with a song can include a title of the song, the name of an artist that recorded the song, the date the song was recorded, a song identifier (e.g., an alphanumeric sequence that allows the song to be uniquely (or with a high probability of success, such as greater than 99.99%) distinguished from other songs), an album identifier (e.g., an alphanumeric sequence that allows the album that includes the song to be uniquely (or with a high probability of success, such as greater than 99.99%) distinguished from other albums) of the album on which the song is included, a track identifier that identifies which track of the album the song is included as, and so forth. By way of another example, the metadata associated with a music video can include a title of the song in the music video, the name of an artist that recorded the song in the music video, the date the music video and/or song in the music video was recorded, a song identifier of the song in the music video (e.g., an alphanumeric sequence that allows the song to be uniquely (or with a high probability of success, such as greater than 99.99%) distinguished from other songs), an album identifier (e.g., an alphanumeric sequence that allows the album that includes the song in the music video to be uniquely (or with a high probability of success, such as greater than 99.99%) distinguished from other albums) of the album on which the song is included, a track identifier that identifies which track of the album the song in the music video is included as, and so forth.

A playlist can be played back, which refers to playing back the audio and/or video content included on the playlist. A playlist includes one or more songs and/or one or more music videos. The playlist is typically a list of identifiers of the songs and music videos that are included on the playlist. Thus, rather than including the actual audio and/or video content for the songs and music videos, the playlist includes identifiers (e.g., file names or other identifiers) of the songs and music videos on the playlist. Alternatively, the playlist can include the actual audio and/or video content for the songs and music videos.

In one or more embodiments, when a playlist is selected for playback (e.g., by a user of computing system 100), presentation module 106 obtains the playlist from playlist management module 102. Presentation module 106 obtains the songs identified on the playlist from audio library 112 and plays back the songs on speaker 110. Audio library 112 can be on the same device as presentation module 106, in which case the files that include the songs are accessed by presentation module 106 and played back on speaker 110. Alternatively, audio library 112 can be on a different device than presentation module 106, in which case the files that include the songs can be downloaded to the device including presentation module 106 and accessed for playback by presentation module 106, or alternatively the songs can be streamed from audio library 112 (or another device, such as an intermediary device or cache) to the device including presentation module 106 and accessed for playback by presentation module 106.

Similarly, presentation module 106 obtains the music videos identified on the playlist from video library 114 and plays back the music videos on screen 108 and speaker 110. Video library 114 can be on the same device as presentation module 106, in which case the files that include the music videos are accessed by presentation module 106 and played back on screen 108 and speaker 110. Alternatively, video library 114 can be on a different device than presentation module 106, in which case the files that include the music videos can be downloaded to the device including presentation module 106 and accessed for playback by presentation module 106, or alternatively the music videos can be streamed from video library 114 (or another device, such as an intermediary device or cache) to the device including presentation module 106 and accessed for playback by presentation module 106.

Alternatively, if the playlist includes the actual audio and/or video content for the songs and music videos, then presentation module 106 plays back the songs included on the playlist on speaker 110, and plays back the music videos included on the playlist on screen 108 and speaker 110. Presentation module 106 obtains the playlist from playlist management module 102, but need not obtain the songs from audio library 112 and music videos from video library 114 because the playlist already includes the audio and/or video content for the songs and music videos.

Figure 2:
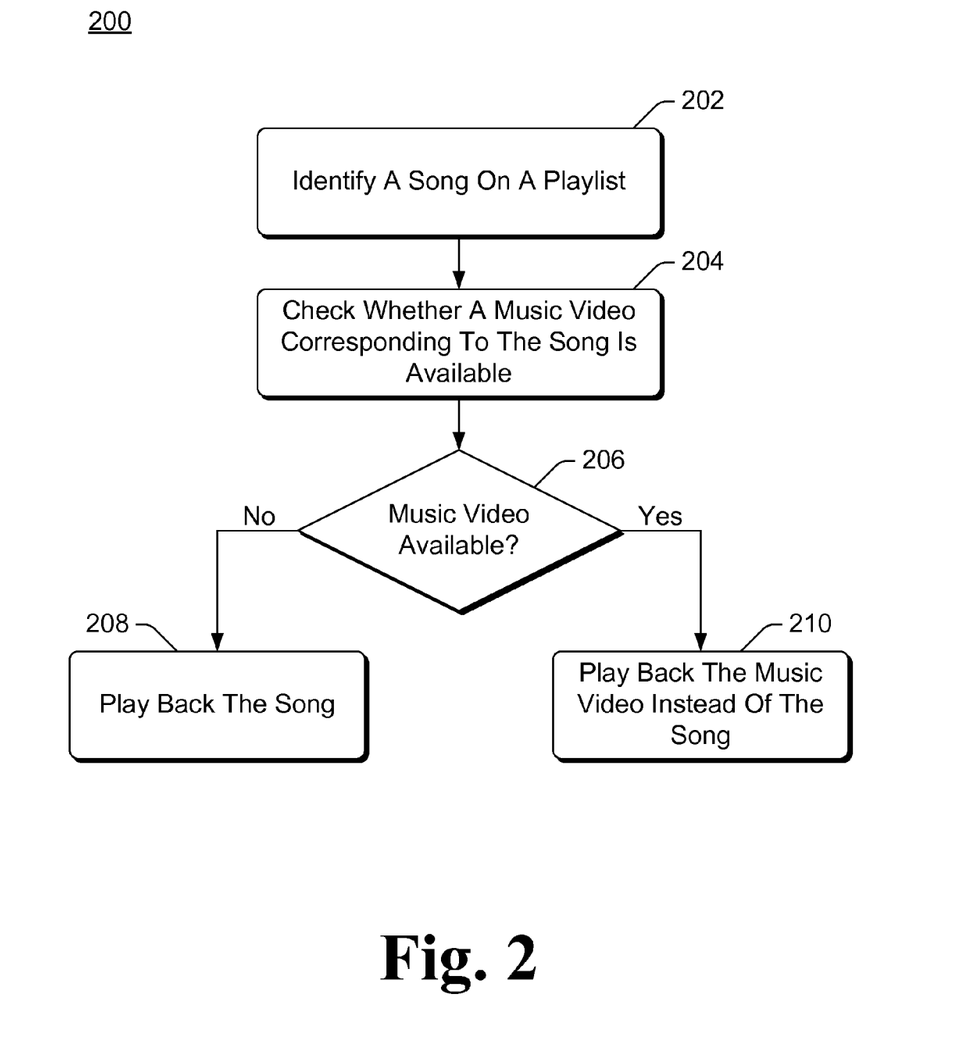
FIG. 2 is a flowchart illustrating an example process for implementing the combining song and music video playback using playlists in accordance with one or more embodiments.

FIG. 2 is a flowchart illustrating an example process 200 for implementing the combining song and music video playback using playlists in accordance with one or more embodiments. Process 200 is carried out by a computing system, such as computing system 100 of FIG. 1, and can be implemented in software, firmware, hardware, or combinations thereof. Process 200 is shown as a set of acts and is not limited to the order shown for performing the operations of the various acts. Process 200 is an example process for implementing the combining song and music video playback using playlists; additional discussions of implementing the combining song and music video playback using playlists are included herein with reference to different figures.

In process 200, a song on a playlist is identified (act 202). The song is identified by retrieving a song identifier of the song from the playlist or from another source (e.g., metadata associated with a file that is identified on the playlist). The song identifier can be a variety of different identifiers that allow the song to be uniquely (or with a high probability of success, such as greater than 99.99%) distinguished from other songs. In one or more embodiments the song identifier is both the album identifier for the song (an identifier of the album on which the song is included) and the track identifier for the song (which track of that album the song is included as). The song identifier allows different versions of the song to be separately identified. For example, different versions of the song sung by different artists have different song identifiers, a live version of the song and a studio-recorded version of the song by the same artist have different song identifiers, and so forth.

A check is made as to whether a music video corresponding to the song is available (act 204). In one or more embodiments, whether a music video corresponds to the song is based on the song identifier identified in act 202. The music video is associated with the song identifier of the song to which it corresponds. For example, metadata associated with the music video includes the song identifier of the song to which the music video corresponds. Thus, a check for whether a music video corresponding to the song is available can be made by checking whether metadata associated with a particular available music video includes the song identifier of the song.

Process 200 proceeds based on whether a music video corresponding to the song is available (act 206). If a music video corresponding to the song is not available, then the song is played back (act 208). This playback includes audibly playing the song, and can also include displaying other images or data regarding the song. For example, an album cover, picture of the artist, or other information maintained in the metadata associated with the song can be displayed concurrently with playback of the song.

However, if a music video corresponding to the song is available, then the music video is played back instead of the song (act 210). In act 210 the song itself is not played back, but rather the music video (which does include audio) is played back—playback of the music video is automatically swapped for playback of the song. Thus, if the music video corresponding to the song is available, then the music video is played back (both audio and video content) rather than just playing back the song (just audio content).

Figure 3:
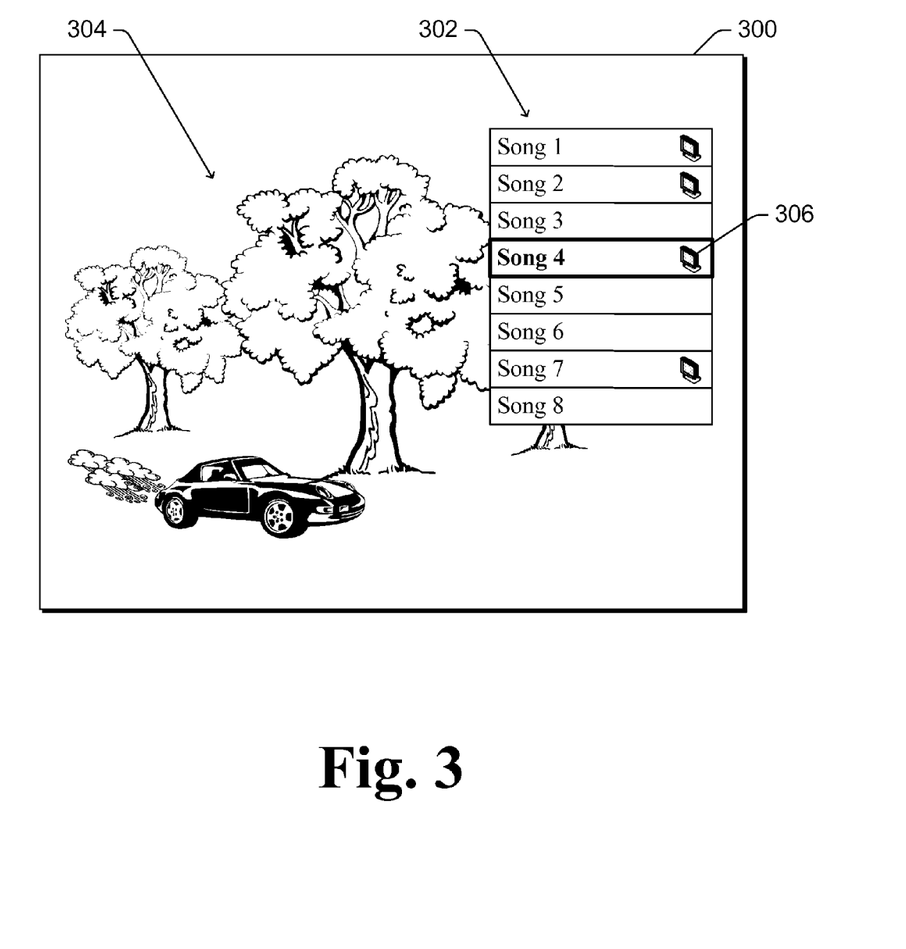
FIG. 3 illustrates an example display in accordance with one or more embodiments of the combining song and music video playback using playlists.

FIG. 3 illustrates an example display 300 in accordance with one or more embodiments of the combining song and music video playback using playlists. Display 300 includes a playlist representation 302 and an image 304 of a music video. Playlist representation 302 is a visual representation of a playlist, and is illustrated as showing eight song titles on the playlist, referred to as "Song 1", "Song 2", "Song 3", "Song 4", "Song 5", "Song 6", "Song 7", and "Song 8". Alternatively, other information in addition to or in place of the song titles can be included on playlist representation 302. A currently playing song is illustrated in some manner, such as having a different outline (e.g., "Song 4" is the currently playing song). It is to be appreciated that the currently playing song can be identified in different manners, such as using animations, using different fonts or colors, displaying the song title or other data for only the currently playing song rather than other songs in the playlist, displaying a "now playing" icon or other indication, and so forth.

As shown in FIG. 3, a music video corresponding to the song titled "Song 4" is played back rather than simply playing back the audio of the song titled "Song 4". Additionally, although example display 300 displays both playlist representation 302 and an image 304 of a music video, both playlist representation 302 and the music video need not be displayed concurrently. For example, the music video may be displayed but not playlist representation 302. By way of another example, playlist representation 302 may be displayed temporarily such as for a first threshold number of seconds (e.g., five seconds) after playback of the music video begins, when the user touches display 300 or otherwise generates an input (e.g., as discussed above referring to input module 104 of FIG. 1), and so forth. In addition, although playlist representation 302 is illustrated as overlaying the image 304 of the music video, playlist representation 302 can alternatively be displayed elsewhere (e.g., in a separate window) so as to not overlay (or just partially overlay) the image 304 of the music video.

Furthermore, in one or more embodiments the displayed playlist representation (e.g., playlist representation 302) includes an indication of whether a music video or simply audio content is played back for a particular song. This indication can take a variety of different forms, such as an icon (e.g., a screen, a film strip, etc.) identifying songs for which music videos are played back, and/or another icon (e.g., a disc, a microphone, etc.) identifying songs for which just audio content is played back. Alternatively, the indication can take different forms other than icons, such as particular text (e.g., "music video" or "audio"), different fonts or colors for music videos than for audio, different animations for music videos than for audio, and so forth. In the example shown in FIG. 3, an icon of a screen is used to indicate that a music video is played back rather than just audio data for a particular song. Thus, an icon 306 is displayed adjacent to the "Song 4" title in playlist representation 302 to indicate that a music video is played back for the song titled "Song 4" rather than the audio of the song titled "Song 4". Similarly, music videos would be played back for the songs titled "Song 1", "Song 2", and "Song 7".

Additionally, although not illustrated in FIG. 3, it should be noted that various other information can also be displayed in addition to the music video. For example, various metadata associated with the music video can be displayed, such as the name of the artist that recorded the song in the music video, the name of the album on which the song is included, and so forth. Additional information can also be displayed, such as the length of the music video, the elapsed playback time of the music video, and so forth.

Figure 4:
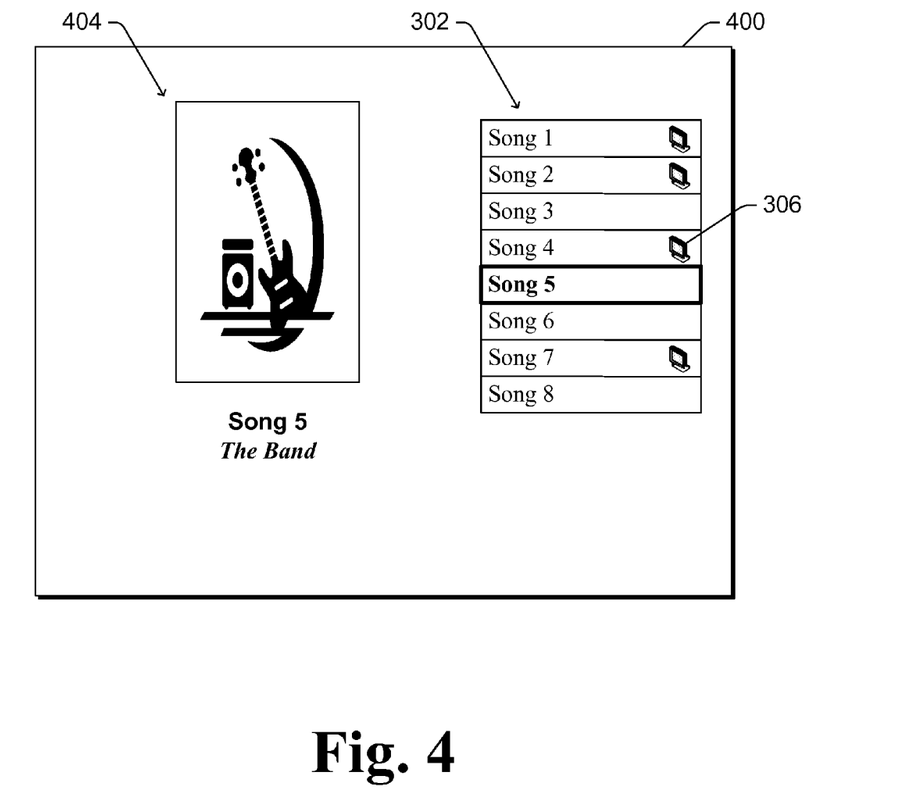
FIG. 4 illustrates another example display in accordance with one or more embodiments of the combining song and music video playback using playlists.

FIG. 4 illustrates another example display 400 in accordance with one or more embodiments of the combining song and music video playback using playlists. Display 400 is similar to display 300 of FIG. 3, except that the currently playing song is "Song 5" rather than "Song 4". No music video corresponding to "Song 5" is available, so one or more images (metadata 404) regarding "Song 5" are displayed rather than a music video.

Display 400 includes playlist representation 302, and metadata 404 for "Song 5". In the illustrated example of FIG. 4, the metadata includes a title of the song ("Song 5"), the name of the artist that recorded the song ("The Band"), and an album cover (a guitar and associated design) of the album on which the song is included. However, it should be noted that various other metadata associated with the song can be displayed in addition to or in place of the metadata illustrated in FIG. 4. Additional information can also be displayed, such as the length of the song, the elapsed playback time of the song, and so forth.

Returning to FIG. 2 and referring again to act 204, a check can be made as to whether metadata associated with a particular available music video includes the song identifier of the song identified in act 202. Whether a music video is available can be determined in a variety of different manners. In one or more embodiments, a music video is available if the user of the computing system implementing process 200 has the right (e.g., permission or a license) to play back the music video. Whether the user has the right to play back the music video can be determined in different manners, such as whether the music video is included in a video library (e.g., video library 114 of FIG. 1) on a computing device that the user is using, whether the user is logged into or signed into an account that permits access to the music video, and so forth.

Alternatively, whether a music video is available can be determined in other manners. For example, a music video can be determined to be available only if the music video is included in video library (e.g., video library 114 of FIG. 1) on a computing device that the user is using, regardless of whether the user has the right to stream or download the music video from another device. By way of another example, a music video can be determined to be available only if the music video is stored in a particular folder, directory, storage device, etc. of the computing device that the user is using.

Additionally, in the discussions above regarding act 204, whether the music video corresponds to a song is based on the song identifier identified in act 202. Alternatively, whether a music video corresponds to a song can be determined in other manners. In one or more embodiments, a user of the computing system implementing process 200 can associate and/or disassociate music videos and songs. If the user has associated a particular music video with a song, then that particular music video corresponds to that song. The correspondence of the song to the associated music video can be maintained in different manners, such as including an identifier of the music video in metadata associated with the song, including an identifier of the song in metadata associated with the music video, maintaining a separate table or other data structure that identifies the song and corresponding music video, and so forth.

Furthermore, if the user has disassociated a particular music video from a song, then that particular music video does not correspond to the song (even if that particular music video is associated with the same song identifier as the song). The manner in which the disassociation is implemented can vary based on the manner in which the correspondence of the song to the associated music video is maintained. For example, an identifier of the music video can be deleted from metadata associated with the song, an identifier of the song can be deleted from metadata associated with the music video, an identification of the song and corresponding music video can be deleted from a separate table or other data structure that identifies songs and corresponding music videos, and so forth.

The user can associate and/or disassociate music videos and songs in a variety of different manners. For example, the user can provide various different inputs (e.g., as discussed above referring to input module 104 of FIG. 1) signifying association of a music video and song, such as selecting icons or other identifiers of the music video and the song from a menu, dragging and dropping an icon or other identifier of the music video onto an icon or other identifier of the song, dragging and dropping an icon or other identifier of the song onto an icon or other identifier of the music video, and so forth. By way of another example, the user can provide various different inputs (e.g., as discussed above referring to input module 104 of FIG. 1) signifying disassociation of a music video and song, such as selecting a button or menu item indicating to delete a particular association of a music video and song, selecting an "X" or delete option in a configuration screen, and so forth.

Process 200 can be performed at different times. In one or more embodiments, process 200 is performed each time a playlist is selected for playback. Acts 202 and 204 can be performed, for example, when the playlist is initially selected or as the songs on the playlist are played. For example, just before a presentation module (e.g., presentation module 106 of FIG. 1) begins buffering or pre-loading a song for playback, the presentation module can check whether a music video corresponding to the song is available. If the music video corresponding to the song is available, then the music video is played back instead of the song, but the playlist itself need not be (but alternatively can be) modified. The playlist can be kept unaltered—continuing to include the song identifier even though the corresponding music video is automatically swapped for the song as the playlist is being played back. By way of another example, when a presentation module (e.g., presentation module 106 of FIG. 1) retrieves or accesses a playlist, the presentation module can check whether a music video corresponding to each song on the playlist is available. The presentation module maintains a record (but can keep the playlist unaltered) of each song for which a corresponding music video is available, and for each such music video play back the music video rather than the corresponding song.

In other embodiments, process 200 is performed at other times. Acts 202 and 204 can be performed, for example, when a playlist is generated (e.g., when the playlist is initially created or a new song is added to the playlist), when a new music video becomes available (e.g., rights to the music video are obtained, the music video is downloaded to a computing device of the user, etc.), and so forth. In such embodiments, the playlist can be modified so that an identifier of the music video (e.g., a file name or other identifier of the music video) is included on the list rather than the song identifier. Alternatively, the identifier of the corresponding music video can be maintained in other manners, such as an additional list or other data structure being associated with the playlist, this additional list or other data structure identifying song identifiers and corresponding music videos. Thus, in such embodiments when the playlist is played back, acts 202-204 have already been performed, and the songs already swapped for the music videos when the corresponding music videos are available.

It should be noted that the various playback controls typically associated with playback of audio content can be maintained, even though music videos are swapped for songs. For example, the user is still able to pause playback of the song or music video, resume playback of the song or music video, skip to the next entry on the playlist (which may be a song or automatically swapped for a music video), and so forth. Users can select these various playback controls by providing various user inputs (e.g., as discussed above referring to input module 104 of FIG. 1).

Additionally, in one or more embodiments a user can generate a playlist that includes both songs and music videos. Such a playlist can be generated based on input from the user (e.g., as discussed above referring to input module 104 of FIG. 1) rather than (or in addition to) automatically swapping songs for music videos as discussed above. During playback, the songs in the playlist are played back audibly, and the music videos are both displayed and played back audibly. Thus, in situations in which a particular song is not available to a user (e.g., the user does not have rights to the song, the song is not stored in a video library on the device being used by the user, etc.), but a music video corresponding to that particular song is available, the user can generate a playlist that includes both songs and music videos.

Figure 5:
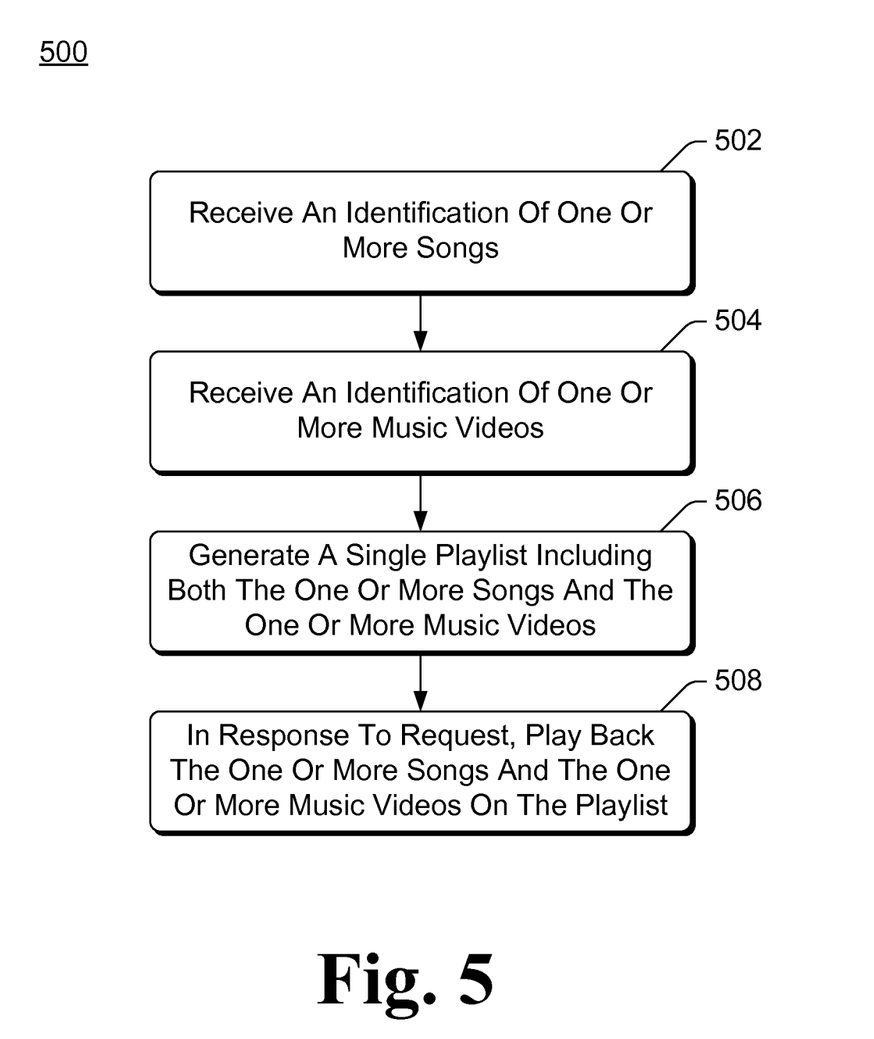
FIG. 5 is a flowchart illustrating an example process for implementing the combining song and music video playback using playlists in accordance with one or more embodiments.

FIG. 5 is a flowchart illustrating an example process 500 for implementing the combining song and music video playback using playlists in accordance with one or more embodiments. Process 500 is carried out by a computing system, such as computing system 100 of FIG. 1, and can be implemented in software, firmware, hardware, or combinations thereof. Process 500 is shown as a set of acts and is not limited to the order shown for performing the operations of the various acts. Process 500 is an example process for implementing the combining song and music video playback using playlists; additional discussions of implementing the combining song and music video playback using playlists are included herein with reference to different figures.

In process 500, an identification of one or more songs is received (act 502). This identification can be received in a variety of different manners, and can be received from a user, from another module or device, and so forth. For example, a user of the computing system implementing process 500 can select (e.g., via inputs as discussed above referring to input module 104 of FIG. 1), one or more songs from a list or other groupings of songs.

An identification of one or more music videos is also received (act 504). This identification can be received in a variety of different manners, and can be received from a user, from another module or device, and so forth. For example, a user of the computing system implementing process 500 can select (e.g., via inputs as discussed above referring to input module 104 of FIG. 1), one or more music videos from a list or other groupings of music videos. The music videos for which identifications are received in act 504 need not (but alternatively can) correspond to songs for which identifications are received in act 502.

A playlist including the one or more songs and the one or more music videos is generated (act 506). The playlist is a single playlist that includes both songs and music videos. The ordering of the songs and music videos in the playlist can be determined in different manners, such as based on the order in which identification of the songs and music videos were received, in an order identified by a user of the computing system implementing process 500, alphabetically by song name, randomly, according to other rules or criteria, and so forth. The playlist can also optionally be stored for subsequent retrieval and playback.

In response to a playback request, the one or more songs and the one or more music videos on the playlist are played back (act 508). This playback includes audibly playing songs (and optionally displaying other images or data regarding the song, such as album cover, picture of the artist, or other information maintained in the metadata associated with the song), and audibly playing the audio content and displaying the video content of music videos. The audio and/or video content for the songs and music videos can be retrieved from audio and video libraries (e.g., libraries 112 and 114 of FIG. 1) based on the identifiers in the playlist, or can be obtained from the playlist itself as discussed above.

Figure 6:
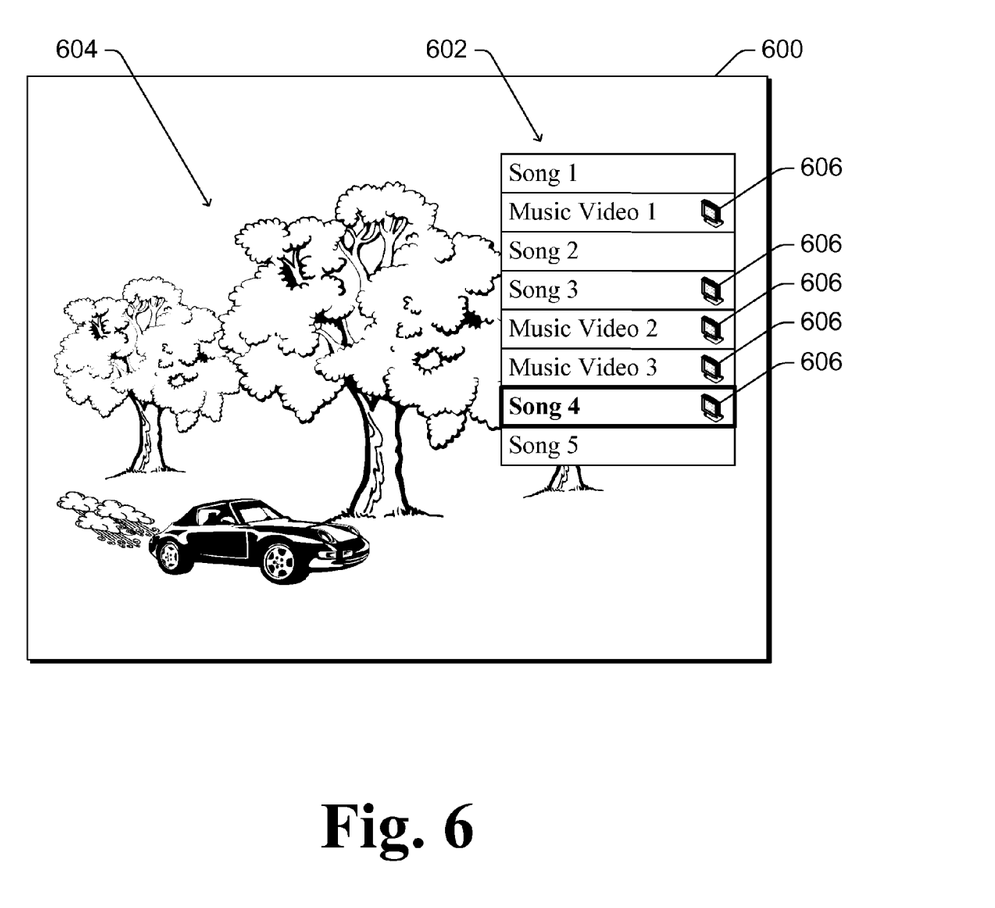
FIG. 6 illustrates another example display in accordance with one or more embodiments of the combining song and music video playback using playlists.

FIG. 6 illustrates another example display 600 in accordance with one or more embodiments of the combining song and music video playback using playlists. Display 600 is similar to display 300 of FIG. 3, including a playlist representation 602 and an image 604 of a music video. Playlist representation 602 is similar to playlist representation 302 of FIG. 3, but playlist representation 602 is a visual representation of a playlist that includes both songs and user-selected music videos. These songs are illustrated in playlist representation 602 as song titles "Song 1", "Song 2", "Song 3", "Song 4", "Song 5", and these user-selected music videos are illustrated in playlist representation 602 as music video titles "Music Video 1", "Music Video 2", and "Music Video 3". Similar to the discussion above regarding FIG. 3, the displayed playlist representation (e.g., playlist representation 602) includes an indication of whether a music video or simply audio content is played back for a particular song or music video on the playlist. Playlist representation 602 includes an icon 606 (a screen in the example of FIG. 6), indicating that a music video will be played back for both user-selected music videos in playlist 602 and music videos that are automatically swapped for songs as discussed above. Alternatively, the indication of whether a music video or simply audio content is played back for a particular song can be different icons or take different forms as discussed above with reference to FIG. 3.

Figure 7:
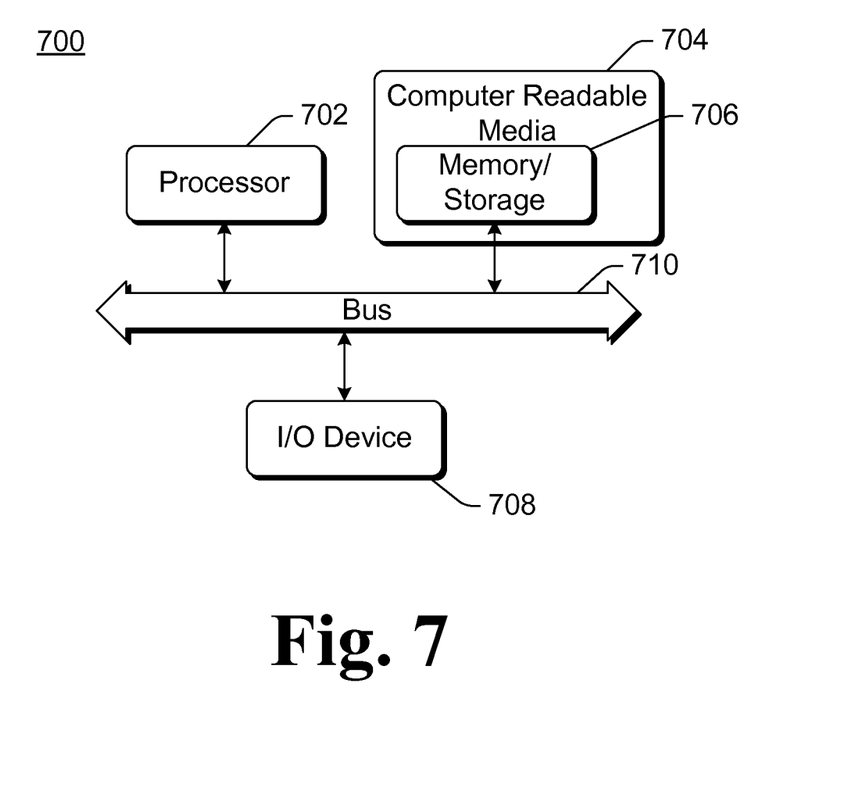
FIG. 7 illustrates an example computing device that can be configured to implement at least part of the combining song and music video playback using playlists in accordance with one or more embodiments.

FIG. 7 illustrates an example computing device 700 that can be configured to implement at least part of the combining song and music video playback using playlists in accordance with one or more embodiments. Computing device 700 (or portions thereof) can be used to implement, for example, one or more of playlist management module 102, input module 104, presentation module 106, screen 108, speaker 110, audio library 112, and video library 114 of FIG. 1.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the combining song and music video playback using playlists techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
maintaining user content in a library on a user's computing system;
maintaining a playlist on the user's computing system, the playlist describing the user content;
associating metadata with the user content;
in response to a user selection of a playlist, identifying a song on the playlist using metadata associated with the song;
checking, using the user's computing system, whether a music video that is associated with metadata including the identified song is included in a video library on the user's computing system;
if the music video associated with metadata that includes the identified song is not included in a video library on the user's computing system, playing back the identified song on the user's computing system, responsive to identifying the song on the playlist; and if the music video associated with metadata that includes the identified song is included in a video library on the user's computing system, playing back on the user's computing system the music video that includes the identified song, instead of the identified song, responsive to identifying the song on the playlist, and modifying the playlist by replacing an identifier of the identified song in the playlist with an identifier of the music video.

2. A method as recited in claim 1, wherein playing back the music video comprises playing back the music video and keeping the playlist unaltered.

3. A method as recited in claim 1, wherein the checking comprises:
   obtaining a song identifier for the song;
   checking, for each of multiple music videos, whether metadata associated with the music video includes the song identifier; and
   determining that one of the multiple music videos corresponds to the identified song if metadata associated with the one of the multiple music videos includes the song identifier.

4. A method as recited in claim 3, wherein the song identifier comprises an album identifier identifying an album on which the song is included and a track identifier identifying which track of the album the song is included as.

5. A method as recited in claim 1, wherein the checking comprises checking whether the music video has been associated with the identified song by the user.

6. A method as recited in claim 1, further comprising performing the identifying and checking when the playlist is generated.

7. A method as recited in claim 1, further comprising performing the identifying and checking while playing back the playlist.

8. One or more computer hardware storage devices having stored thereon multiple instructions that, when executed by one or more processors, cause the one or more processors to perform operations comprising:
   maintaining user content in a library on a user's computing system;
   maintaining a playlist on the user's computing system, the playlist describing the user content;
   associating metadata with the user content;
   in response to a user selection of a playlist, identifying a song on the playlist using metadata associated with the song;
   checking, using the user's computing system, whether a music video that is associated with metadata including the identified song is included in a video library on the user's computing system;
   if the music video associated with metadata that includes the identified song is not included in a video library on the user's computing system, playing back the identified song on the user's computing system, responsive to identifying the song on the playlist; and
   if the music video associated with metadata that includes the identified song is included in a video library on the user's computing system, playing back on the user's computing system the music video that includes the identified song, instead of the identified song, responsive to identifying the song on the playlist, and modifying the playlist by replacing an identifier of the identified song in the playlist with an identifier of the music video.

9. The one or more computer hardware storage devices as recited in claim 8, wherein playing back the music video comprises playing back the music video and keeping the playlist unaltered.

10. The one or more computer hardware storage devices as recited in claim 8, wherein the checking comprises:
    obtaining a song identifier for the song;
    checking, for each of multiple music videos, whether metadata associated with the music video includes the song identifier; and
    determining that one of the multiple music videos corresponds to the identified song if metadata associated with the one of the multiple music videos includes the song identifier.

11. The one or more computer hardware storage devices as recited in claim 10, wherein the song identifier comprises an album identifier identifying an album on which the song is included and a track identifier identifying which track of the album the song is included as.

12. The one or more computer hardware storage devices as recited in claim 8, wherein the checking comprises checking whether the music video has been associated with the identified song by the user.

13. The one or more computer hardware storage devices as recited in claim 8, further comprising performing the identifying and checking when the playlist is generated.

14. The one or more computer hardware storage devices as recited in claim 8, further comprising performing the identifying and checking while playing back the playlist.

15. A computing device comprising:
    one or more processors;
    one or more computer hardware storage media having stored thereon multiple instructions that, when executed by the one or more processors, cause the one or more processors to perform operations comprising:
      maintaining user content in a library on a user's computing system;
      maintaining a playlist on the user's computing system, the playlist describing the user content;
      associating metadata with the user content;
      in response to a user selection of a playlist, identifying a song on the playlist using metadata associated with the song;
      checking, using the user's computing system, whether a music video that is associated with metadata including the identified song is included in a video library on the user's computing system;
      if the music video associated with metadata that includes the identified song is not included in a video library on the user's computing system, playing back the identified song on the user's computing system, responsive to identifying the song on the playlist; and
      if the music video associated with metadata that includes the identified song is included in a video library on the user's computing system, playing back on the user's computing system the music video that includes the identified song, instead of the identified song, responsive to identifying the song on the playlist, and modifying the playlist by replacing an identifier of the identified song in the playlist with an identifier of the music video.

16. The computing device as recited in claim 15, wherein playing back the music video comprises playing back the music video and keeping the playlist unaltered.

17. The computing device as recited in claim 15, wherein the checking comprises:

obtaining a song identifier for the song;

checking, for each of multiple music videos, whether metadata associated with the music video includes the song identifier; and determining that one of the multiple music videos corresponds to the identified song if metadata associated with the one of the multiple music videos includes the song identifier.

18. The computing device as recited in claim 17, wherein the song identifier comprises an album identifier identifying an album on which the song is included and a track identifier identifying which track of the album the song is included as.

19. The computing device as recited in claim 15, wherein the checking comprises checking whether the music video has been associated with the identified song by the user.

20. The computing device as recited in claim 15, further comprising performing the identifying and checking when the playlist is generated.

\* \* \* \* \*